(12) United States Patent
Week et al.

(10) Patent No.: US 9,754,121 B2
(45) Date of Patent: Sep. 5, 2017

(54) SYSTEM AND METHODS FOR LIVE MASKING FILE SYSTEM ACCESS CONTROL ENTRIES

(71) Applicant: Oracle International Corporation, Redwood City, CA (US)

(72) Inventors: Lisa Week, Golden, CO (US); Mark Shellenbaum, Westminster, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 11 days.

(21) Appl. No.: 13/654,734

(22) Filed: Oct. 18, 2012

(65) Prior Publication Data

US 2014/0115005 A1    Apr. 24, 2014

(51) Int. Cl.
*G06F 21/00* (2013.01)
*G06F 21/62* (2013.01)

(52) U.S. Cl.
CPC .. *G06F 21/6218* (2013.01); *G06F 2221/2141* (2013.01)

(58) Field of Classification Search
CPC .................. G06F 17/3007; G06F 17/30943
See application file for complete search history.

(56) References Cited

U.S. PATENT DOCUMENTS

| | | | |
|---|---|---|---|
| 6,202,066 B1 * | 3/2001 | Barkley et al. | 707/785 |
| 7,702,693 B1 * | 4/2010 | Aiyagari et al. | 707/785 |
| 7,836,080 B2 * | 11/2010 | DeBie | 707/785 |
| 2002/0026592 A1 * | 2/2002 | Gavrila et al. | 713/201 |
| 2007/0283443 A1 * | 12/2007 | McPherson et al. | 726/26 |
| 2008/0104665 A1 * | 5/2008 | Naldurg et al. | 726/2 |

OTHER PUBLICATIONS

Kumar et al., "Implementing an Advanced Access Control Model on Linux", Proceedings of the 2010 Ottawa Linux Symposium, 2010.*
Mahooney et al., "A Linux Implementation of Windows ACLs", IJCSNS International Journal of Computer Science and Network Security, vol. 10, No. 7, Jul. 2010.*

* cited by examiner

*Primary Examiner* — Tyler Torgrimson
(74) *Attorney, Agent, or Firm* — Kilpatrick Townsend & Stockton LLP

(57) ABSTRACT

Implementations described and claimed herein provide systems and methods for dynamically masking an access control list corresponding to a file system object in response to a change mode command. In one implementation, a change mode command for a file system object to change a first mode to a second mode is received. The first mode defines a first set of access rights and the second mode defines a second set of access rights. In response to the change mode command, a mask is dynamically applied to an access control list corresponding to the file system object. The access control list has zero or more access control entries defining access permissions for the file system object. The mask modifies any of the zero or more access control entries that have access permissions that exceed the second set of access rights defined by the second mode. The access control list is preserved.

15 Claims, 4 Drawing Sheets

SYSTEM AND METHODS FOR LIVE MASKING FILE SYSTEM ACCESS CONTROL ENTRIES

TECHNICAL FIELD

Aspects of the present disclosure relate to data storage system security, and in particular, systems and methods for live masking file system access control entries in an access control list.

BACKGROUND

Many large scale data storage systems involve a plurality of users sharing access to objects stored in a file system, including files, folders, directories, programs, processes, etc. Generally, file systems manage access permissions of certain users or groups of users to control the ability of the users or groups to access a file system object. In other words, if a user attempts to access a file system object, the file system determines whether the user is allowed to access the file system object prior to providing access. Many file systems use standard UNIX modes and/or access control lists (commonly referred to as "ACLs") to manage access to file system objects.

Standard UNIX modes are defined as read (r), write (w), and execute (x). The read modes grants permission to read a file system object, the write mode grants permission to modify a file system object, and the execute mode grants permission to run a file system object. The standard UNIX modes are managed based on three types of classes: owner, group, and other. The owner class applies to the user who owns the file system object, the group class applies to those who are in the group that has been given access to the file, which may include the owner, and the other class applies to all others to whom neither the owner class nor the group class applies. A user, for example the owner, may be part of multiple groups. The standard UNIX modes may be changed with a change mode command or utility (commonly referred to as a "chmod"). While standard UNIX modes are relatively easy to use for individual file system objects, the ability to assign permissions is relatively limited.

ACLs generalize and enlarge this concept by providing fine-grained access control over file system objects. An ACL is a data structure containing zero or more access control entries (commonly referred to as "ACEs"), which define a variety of access rights for various types of users. Stated differently, ACLs are not limited to only the standard read, write, and execute modes or to only the owner, group, and other classes. While ACLs provide greater flexibility in assigning access rights, using ACLs is relatively complex and challenging for a large number of file system objects.

Many file systems utilize a combination of standard UNIX modes and ACLs to manage access to file system objects. However, several difficulties exist with respect to controlling ACL and mode interactions. One such difficulty is preserving an ACL across chmod operations. Some attempts to address this difficulty resulted in the ACL changing in a non-intuitive way, by inserting deny type ACEs that restrict access into the ACL. This caused confusion to users and resulted in interoperability issues between Windows and UNIX users. Many file systems abandoned this approach, opting instead to discard the ACL during a chmod operation. Under this approach, a chmod operation for a file system object deletes any ACL associated with the file system object and replaces the ACL with a trivial ACL derived from the new mode set by the chmod operation. However, it is undesirable and inefficient to delete and replace an ACL entirely upon each chmod operation.

It is with these observations in mind, among others, that various aspects of the present disclosure were conceived and developed.

SUMMARY

Implementations described and claimed herein address the foregoing problems by providing systems and methods for unified access control using live masking of ACEs. In one implementation, a change mode command for a file system object to change a first mode to a second mode is received. The first mode defines a first set of access rights and the second mode defines a second set of access rights. In response to the change mode command, a mask is dynamically applied to an access control list corresponding to the file system object using at least one processor. The access control list has zero or more access control entries defining access permissions for the file system object. The mask modifies any of the zero or more access control entries that have access permissions that exceed the second set of access rights defined by the second mode.

Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

DETAILED DESCRIPTION

Aspects of the present disclosure involve systems and methodologies for providing unified access control using live masking of ACEs based on chmod operations. In one aspect, rather than discard an ACL during a chmod operation, the original ACL is preserved with portions of the original ACL being masked in accordance with the chmod operation. As such, a subsequent chmod operation may restore the original ACL.

As detailed herein, in response to a chmod operation reducing permissions, a masking operation is performed to reduce permissions of individual ACEs during ACL retrieval and access control operations. Stated differently, the masking operation applies a mask dynamically to hide any ACE permission in an ACL corresponding to a file system object to which a user is requesting access and that exceeds maximum permissions set by the chmod operation. Any ACE permission that does not exceed the maximum permissions set by the chmod operation, for example, an ACE denying access, is not masked and applies during access control operations. A subsequent chmod operation to set access rights to a less restrictive mode restores the original ACE permissions that were masked.

In some aspects, the masking operation involves an owner mask and a group mask. The owner mask applies to an ACE that identifies a user that is an owner of the file system object. The owner mask represents maximum permissions of the owner of the file system object in accordance with the chmod operation. The group mask applies to an ACE identifying a group. The group mask represents maximum group permissions of the file system object in accordance with the chmod operation.

The masking operation masks ACE permissions that exceed maximum permissions set by the chmod operation without persistently modifying any ACE. As a result, a chmod operation does not destroy an ACL placed on a file system object. Further, interoperability between Windows and UNIX based systems is significantly enhanced and both systems are provided with a consistent view of access permissions for a file system object. These and other advantages will be apparent from the present disclosure.

Figure 1:
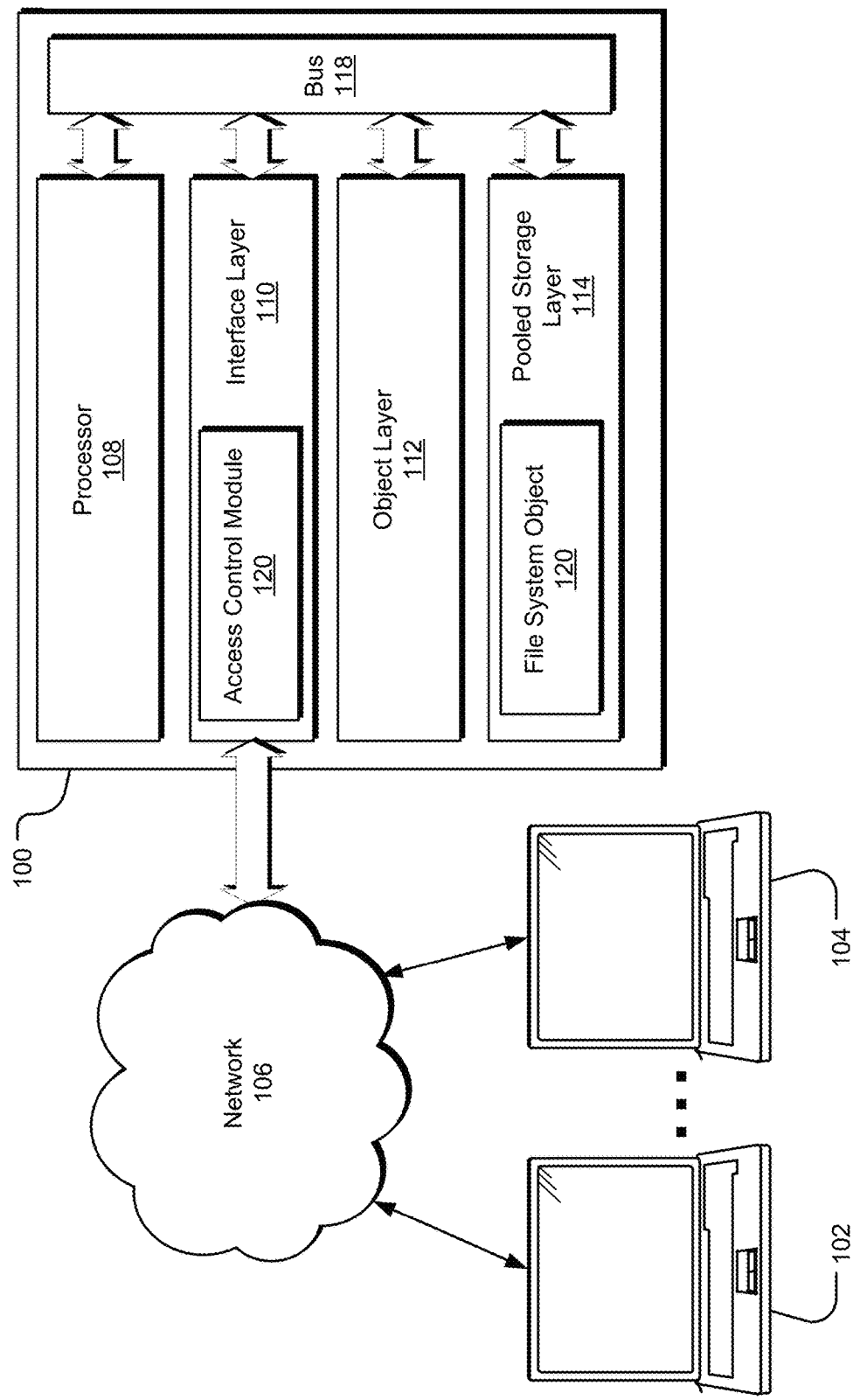
FIG. 1 is an example file system providing unified access control.

Referring to FIG. 1, which shows an example file system 100 providing unified access control, one or more users 102, 104 access data stored in and managed by the file system 100 via a network 106. In one particular implementation, the file system 100 is a local file system, such as ZFS, that is POSIX-compliant and uses an implementation of NFSv4 ACLs. Stated differently, the file system 100 utilizes both a version of UNIX modes and of ACLs to manage access control to file system objects. It will be appreciated by those of ordinary skill that the architecture illustrated in FIG. 1 is an example only and the systems and methods described herein may be implemented in a variety of environments and architectures.

In one implementation, the file system 100 includes a processor 108, an interface layer 110, an object layer 112, and a pooled storage layer 114 in communication via a bus 116. The clients 102, 104 interact with the file system 100 through the interface layer 110, which receives instructions from the clients 102, 104 and the processor 108 and communicates the instructions to the object layer 112. In one particular implementation, the interface layer 110 provides POSIX file system semantics. The object layer 112 translates the instructions received from the interface layer 110 and communicates the instructions to the pooled storage layer 114. The object layer 112 may present a transactional object model that provides access to data, such as a file system object 118, stored in the storage pool 114, which involves writable storage media.

The interface layer 110 includes an access control module 120 for performing access control operations using UNIX mode or ACL commands or some combination of the two. As stated above, the UNIX mode commands involve three classes: owner, group, and other; and three permissions: read, write, and execute. In one implementation, mode commands are represented numerically. Stated differently, a numerical value may be input to set the permissions for the owner, group, and other classes as follows: the value 7 represents full access permission (read, write, and execute); the value 6 represents read and write access permission only; the value 5 represents read and execute access permission only; the value 4 represents read access permission only; the value 3 represents write and execute access permission only; the value 2 represents write access permission only; the value 1 represents an execute permission only; and the value 0 represents no access permission. The access permissions may be set by inputting one of the numerical values for the owner class followed by one of the numerical values for the group class and finally one of the numerical values for the other class. Accordingly, to set a mode where the owner has full access, the group has read and write access only, and all others have read access only, 764 is input. A chmod operation to change the mode to a new mode where the owner has read and write access only, the group has read access only, and all others have no access, 640 is input.

ACLs may provide more granular access control. Specifically, each ACE comprises multiple components, including a type component, an access mask bit component, a who component, and a flag component. The type component defines the access type, which may be allow, deny, audit, and alarm. In other words, for example, the access control module 120 permits access as defined in the ACE where the type component is set to allow and restricts access as defined in the ACE where the type component is set to deny. The access mask bit component defines the permissions that are controlled by the ACE. The permissions are generally divided into two categories: one that controls access permissions to the file system object 118 (e.g., permission to read the data of a file, permission to list the contents of a directory, permission to delete a file, etc.); and one that controls management permissions for the file system object 118 (e.g., permission to modify an ACL for the file system object 118, permission to change ownership of the file system object 118, etc.). The who component defines to whom the ACE applies. The who may be a username, a group name, or a special identifier, which may be abstractions used by UNIX variant systems to indicate the file system object 118 owner ("owner@") or the file system object 118 owning group ("group@") or everyone ("everyone@"). The special identifier everyone@ is not equivalent to the UNIX other class. Instead, everyone@ designates every user, including the owner and the owner group. Finally, the flag component defines inheritance properties of an ACE, specifies whether the ACE applies to a user or a group, or works in conjunction with the audit and alarm types, which define an operation set to occur if a certain access is attempted.

The access control module 120 initially sets access control operations for the file system object 118 using either the UNIX mode or ACL. If UNIX mode is used, the access control module 120 computes a trivial ACL reflecting the mode. The trivial ACL would include ACEs corresponding to the permissions set for the owner and the group by the mode. If an ACL is set, the access control module 120 computes a mode corresponding to the ACE permissions set for the owner and the group. Both the mode and the ACL are stored in the pooled storage layer 114.

The access control module 120 receives, processes, and responds to access requests based on the set access control information. In one implementation, the interface 110 receives an access request to the file system object 118 stored in the pooled storage layer 114 from the users 102, 104 via the network 106. The access control module 120 processes access requests in the order in which they are received. In other words, if the interface 110 receives an access request from the user 102 prior to an access request from the user 104, the access control module 120 processes the access request from the user 102 first.

In processing the access request from the user 102, the access control module 120 determines whether the user 102 matches the who component in a first ACE in the ACL. Only the ACEs that contain a who component matching the identification of the user 102 apply to the access request. If the who component in the first ACE does not match the user 102, the access control module 120 process the ACEs in order from the first ACE in the ACL to a last ACE. Once the access control module 120 processes an ACE having a who component matching the user 102 and an access mask bit component defining permissions for the requested access, the access control module 120 responds to the request based on the access control information set forth in that ACE. Stated differently, in response to an access request for the file system object 118 stored in the pooled storage layer 114, the access control module 120 processes ACEs in an ACL for the file system object 118 in order, traversing each ACE until the access control module 120 processes an applicable ACE. The access control module 120 then applies the access control information defined in the applicable ACE to the request. If the access control module 120 reaches the last ACE in the ACL and none of the ACEs have a who component matching the identification of the user 102, the access control module 120 restricts access to the user 102.

If the access control information permits access to the file system object 118, the interface layer 110 communicates instructions to access to the object layer 112, which communicates with the pooled storage layer 114 to provide the user 102 access to the file system object 118. If the access control information restricts access to the file system object 118, the interface 110 sends a response to the user 102 denying access to the file system object 118.

As an example, the interface 110 receives an access request to execute the file system object 118 from the user 102 who is not the owner of the file system object 118 but is in the same group as the owner of the file system object 118 as well as in the staff group. The access control module 120 obtains the ACL corresponding to the file system object 118, which has the following access control information:

| ACE0 | user: User104 | r—— | allow |
| ACE1 | user: User102 | rw— | deny |
| ACE2 | group: staff | rw— | allow |
| ACE3 | owner@ | rwx | allow |
| ACE4 | group@ | rw— | allow |
| ACE5 | everyone@ | r—x | allow |

The access control module 120 processes the ACEs in the ACL for the file system object 118 in the order in which they are listed, in this example, starting with ACE0. The ACE0 applies to the user 104, not the user 102. Accordingly, the access control module 120 moves to ACE1. When the access control module 120 processes the ACE1, the access control module 120 determines that while the ACE1 matches the user 102, the ACE1 does not apply to the request by the user 102 to execute the file system object 118. The ACE1 denies read and write access to the file system object 118. However, the ACE1 does not deny execute access to the file system object 118. Accordingly, the access control module 120 moves on to ACE2, which similar to the ACE1 does not apply to the request to execute the file system object 118. Because the user 102 is not the owner of the file system object 118, the ACE3 does not apply to the request from the user 102. The access control module 120 then processes ACE4, which like the ACE1 and the ACE2 does not apply to the request to execute the file system object 118. The access control module 120 finally processes ACE5, which allows the user 102 to execute the file system object 118. The access control module 120 responds to the access request from the user 102 by providing the user 102 execute access to the file system object 118.

If the access control module 120 receives a chmod command restricting owning group access permissions for the file system object 118, rather than discarding the ACL corresponding to the file system object 118, the access control module 120 preserves the ACL and applies a group mask to portions of the ACL. Specifically, if the ACL has multiple ACEs for different users and groups, the access control module 120 modifies the ACEs to not allow permissions beyond what the chmod operation restricted the owning group access permissions to. Stated differently, rather than insert deny ACEs into the ACL to restrict access, the access control module 120 modifies existing ACEs to reflect the restricted mode by masking any permissions in excess of the permissions set by the chmod operation. The access control module 120 removes the owning group ACE and the everyone ACE and adds a new group ACE and a new everyone ACE corresponding to the chmod operation to the bottom of the ACL. In one implementation, the access control module 120 does not apply the mask to any existing ACEs denying access, and consequently, the ACEs denying access are unmodified in response to the chmod operation. If the ACE reflects access rights for the owner, the access control module 120 does not modify the ACEs in response to the chmod operation restricting owning group access. Instead, the access control module 120 applies an owner mask to ACEs applying to the owner of the file system object 118 based on the permissions set by the chmod operation for the owner class.

To simplify, if the access control module 120 receives a chmod command restricting permissions for the owner class and the owning group class, the access control module 120 removes the owner ACE, the owning group ACE, and the everyone ACE and adds a new owner ACE, a new owning group ACE, and a new everyone ACE to the bottom of the ACL. The access control module 120 modifies each user and group ACE that does not apply to the owner to reduce the permissions in those ACEs, where necessary, so the permissions do not exceed the permissions of the new owning group ACE. The access control module 120 modifies each ACE applying to the owner, where necessary, such that the permissions in those ACEs do not exceed the permissions of the new owner ACE. The new ACL corresponds to the chmod operation and provides an accurate representation of the permissions on the file system object 118 for both Windows and Unix based systems. The access control module 120 does not persistently modify any of the ACEs during the masking operations. Rather, the ACL is preserved with portions of the ACL being hidden in accordance with the chmod operation, as detailed above. If the user 102, for example, requests access to the file system object 118 after the access control module 120 performs the chmod operation, the new ACL governs the access request from the user 102.

Using the same example provided above, if the access control module 120 performs a chmod operation, such as chmod 640, which limits the owner class permissions to read and write, the owning group class permissions to read, and the other class permissions to none, the access control module 120 masks the ACL as follows:

| ACE0 | user: User104 | r—— | allow |
| ACE1 | user: User102 | rw— | deny |
| ACE2 | group: staff | r—— | allow |
| ACE3 | owner@ | rw— | allow |
| ACE4 | group@ | r—— | allow |
| ACE5 | everyone@ | —— | allow |

Specifically, the access control module 120 applies a group mask and an owner mask to hide portions of the ACL such that the permissions defined in the ACEs do not exceed the maximum permissions set in the chmod operation. Because the access control module 120 does not discard the ACL or persistently modify the ACEs, a subsequent chmod operation may be used to restore the permissions in the original ACL.

Again using the example above, if the access control module 120 performs a chmod operation to a less restrictive mode with respect to the owner and owning group, such as chmod 765, which provides full access to the owner class, read and write access to the owning group class, and no access to the other class, the access control module 120 restores the ACL as follows:

| ACE0 | user: User104 | r—— | allow |
| ACE1 | user: User102 | rw— | deny |
| ACE2 | group: staff | rw— | allow |
| ACE3 | owner@ | rwx | allow |
| ACE4 | group@ | rw— | allow |
| ACE5 | everyone@ | r—x | allow |

Figure 2:
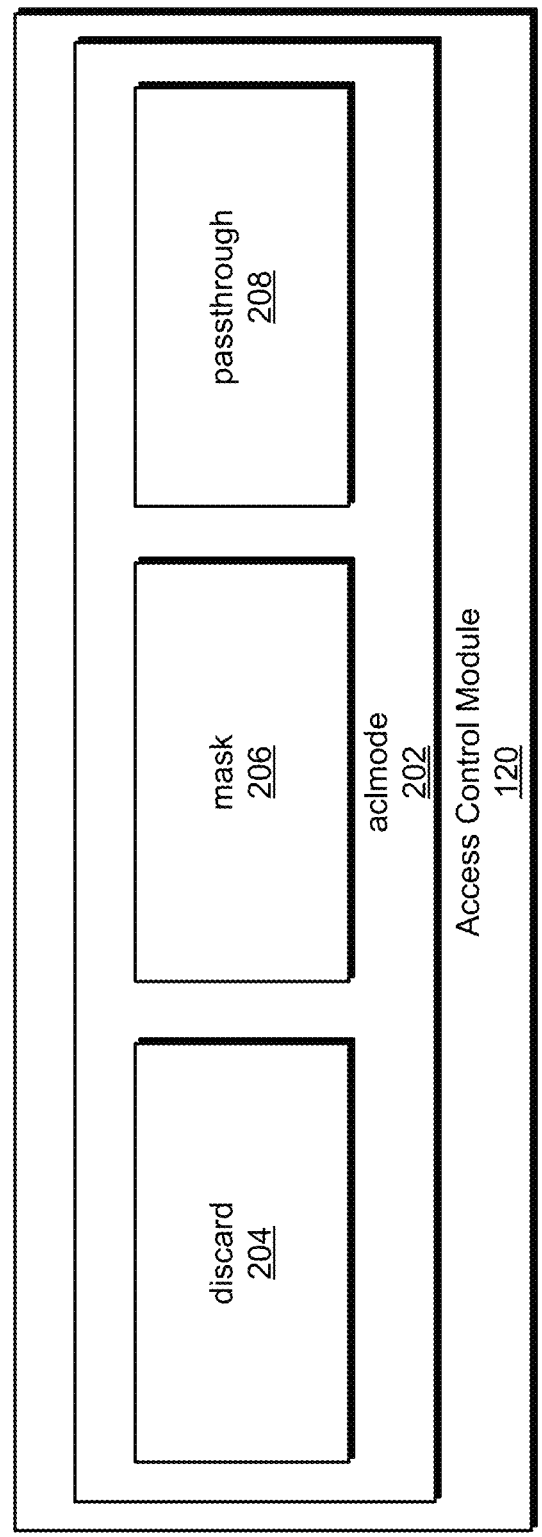
FIG. 2 is an example access control module providing unified access control.

Referring to FIG. 2, in one implementation, the access control module 120 includes an aclmode module 202, which controls how an ACL for a file system object is modified in response to a chmod operation. In one implementation, the aclmode module 202 includes a discard property 204, a mask property 206, and a passthrough property 208.

In response to a chmod operation reducing permissions for a file system object, the discard property 204 deletes the original ACL for the file system object and creates a new trivial ACL representing the mode set by the chmod.

Conversely, the mask property 206 masks portions of the original ACL to correspond to the mode set by the chmod operation. Specifically, the mask property 206 applies an owner mask to reduce owner permissions such that the permissions are no greater than the owner class permission bits, and the mask property 206 applies a group mask to reduce user and group permissions such that they are no greater than the owning group class permission bits. The mask property 206 preserves the original ACL across mode changes, such as chmod operations.

The passthrough property 208 preserves the original ACL during a chmod operation such that no changes are made to the ACL with the exception of the passthrough property 208 generating new ACEs to represent the new mode created by the chmod operation.

Figure 3:
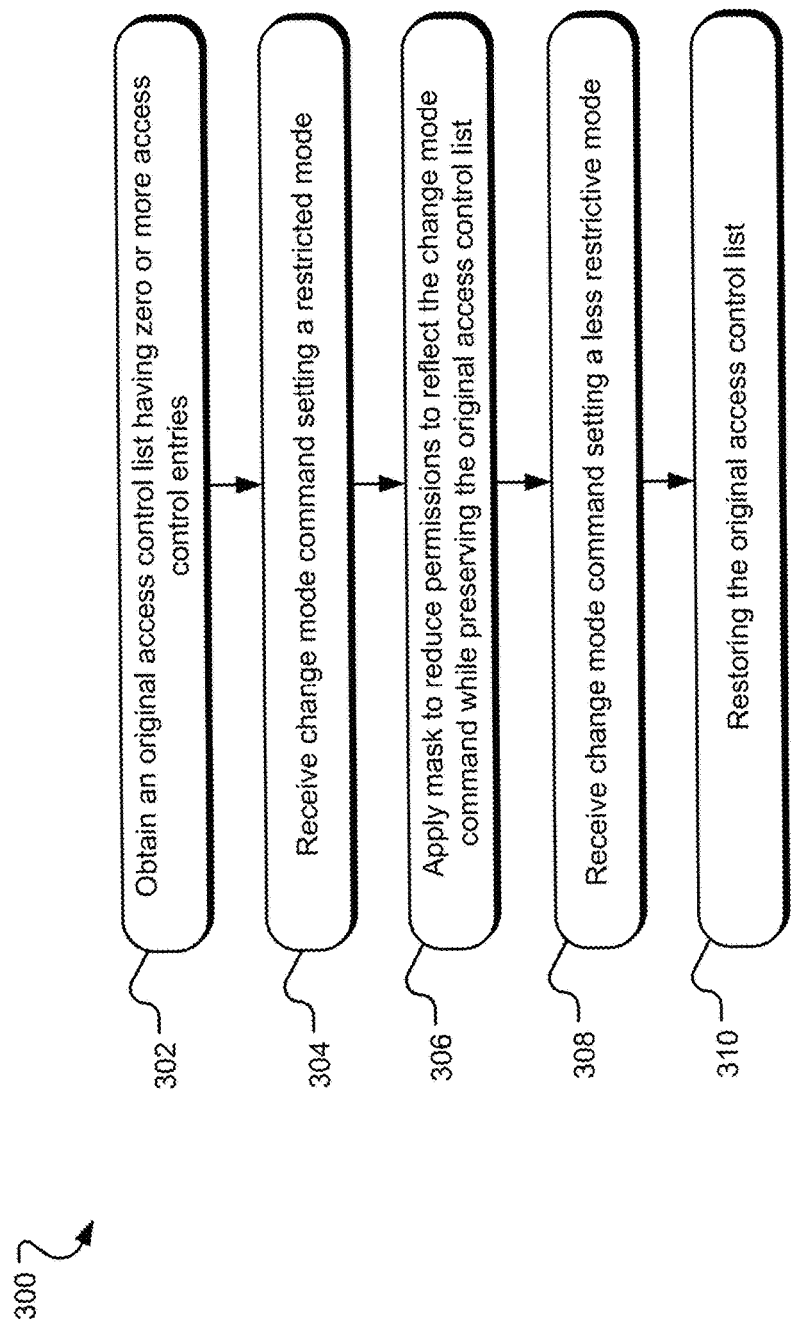
FIG. 3 is a flow chart illustrating example operations for live masking access control entries.

Turning now to FIG. 3, which is a flow chart illustrating example operations 300 for live masking access control entries, an obtaining operation 302 obtains an ACL having zero or more ACEs for a file system object setting forth access permissions. In one implementation, the obtaining operation 302 creates the ACL. In another implementation, the obtaining operation 302 inherits zero or more ACEs when the file system object is created. In still another implementation, the obtaining operation 302 computes a trivial ACL when a mode for the file system object is originally set. The ACL controls access to the file system object.

A receiving operation 304 receives a chmod command setting a restricted mode for the file system object. The chmod command may reduce the permissions for the owner class, the owning group class, and/or the other class.

In response to the receiving operation 304, a masking operation 306 applies a mask to the ACL to reduce the permissions to reflect the chmod command. In one implementation, the masking operation 306 applies an owner mask which modifies ACEs that apply to the owner of the file system object such that the permissions in those ACEs do not exceed the reduced permissions set forth in the chmod operation for the owner class. The masking operation 306 applies a group mask which modifies ACEs that apply to users and groups that do not apply to the owner of the file system object such that the permissions in those ACEs do not exceed the reduced permissions set forth in the chmod operation for the owning group class. The masking operation 306 preserves the original ACL.

If the access control information set forth in the original ACL is desired, a second receiving operation 308 receives a subsequent chmod command setting a less restrictive mode. The subsequent chmod command may set a less restrictive mode for the owner class, the owning group class, and/or the other class. In response to the second receiving operation 308, a restoring operation 310 restores the original ACL with the permissions set forth in the ACEs.

Figure 4:
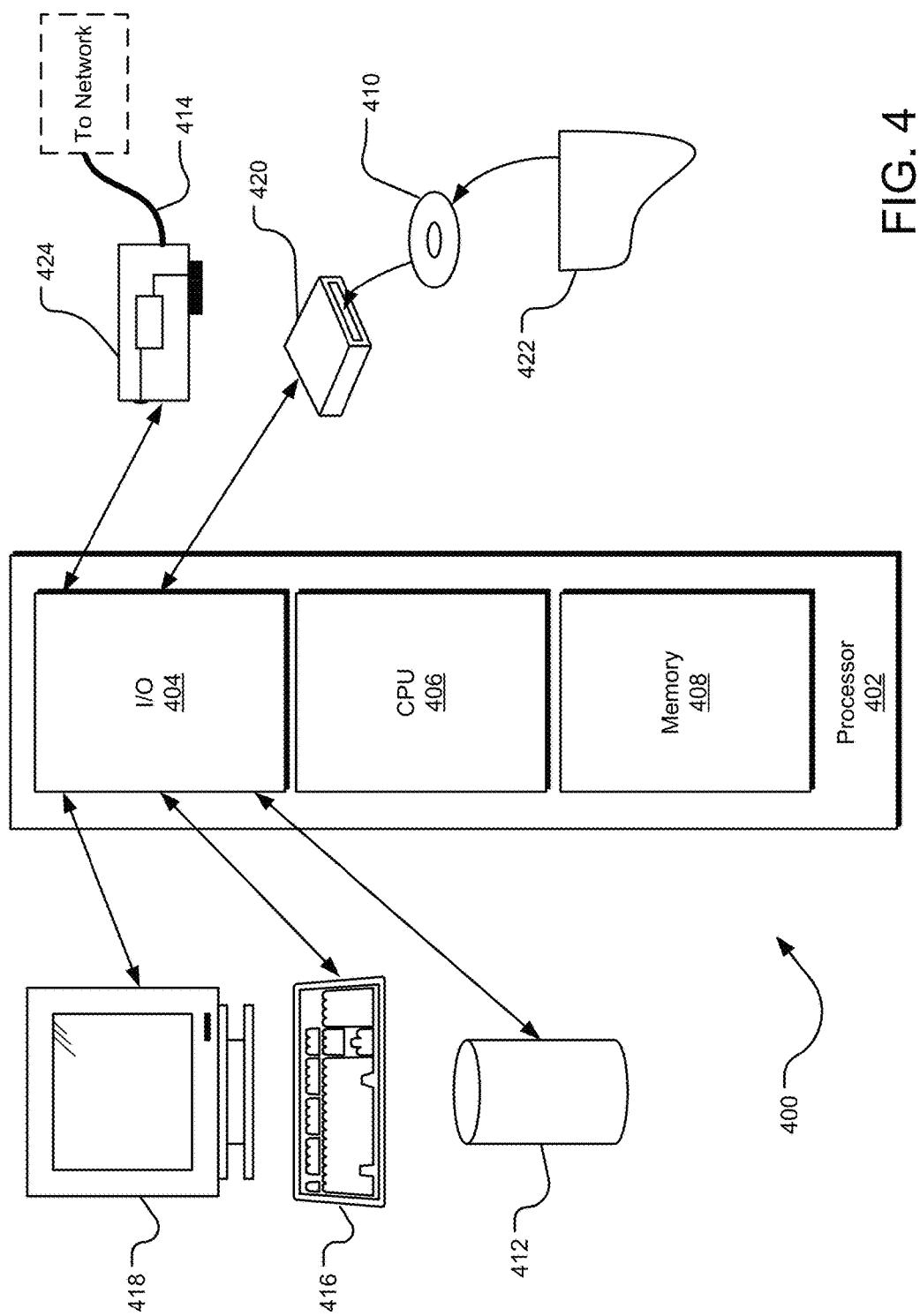
FIG. 4 is an example computer system that may implement various systems and methods of the presently disclosed technology.

FIG. 4 shows an example computer system 400 that may implement various systems and methods of the presently disclosed technology. The computer system 400 is capable of executing a computer program product to execute a computer process. Data and program files may be input to the computer system 400, which reads the files and executes the programs therein. Some of the elements of the general purpose computer system 400 are shown in FIG. 4, wherein a processor 402 is shown having an input/output (I/O) section 404, a Central Processing Unit (CPU) 406, and memory 408.

There may be one or more processors 402, such that the processor 402 of the computer system 400 comprises the CPU 406 or a plurality of processing units, commonly referred to as a parallel processing environment. The computer system 400 may be a conventional computer, a distributed computer, or any other type of computer, such as one or more external computers made available via a network architecture. The presently described technology is optionally implemented in software devices loaded in the memory 408, stored on a configured DVD/CD-ROM 410 or a storage unit 412, and/or communicated via a network link 414, thereby transforming the computer system 400 in FIG. 4 to a special purpose machine for implementing the operations described herein.

The I/O section 404 is connected to one or more user-interface devices (e.g., a keyboard 416 and a display unit 418), the storage unit 412, and a disk drive 420. In one implementation, the disk drive 420 is a DVD/CD-ROM drive unit capable of reading the DVD/CD-ROM 410, which typically contains programs and data 422. In another implementation, the disk drive 420 is a solid state drive unit.

Computer program products containing mechanisms to effectuate the systems and methods in accordance with the presently described technology may reside in the memory 404, on the storage unit 412, on the DVD/CD-ROM 410 of the computer system 400, or on external storage devices made available via a network architecture with such computer program products, including one or more database management products, web server products, application server products, and/or other additional software components. Alternatively, the disk drive 420 may be replaced or supplemented by a floppy drive unit, a tape drive unit, or other storage medium drive unit. The network adapter 424 is capable of connecting the computer system 400 to a network via the network link 414, through which the computer system 400 can receive instructions and data embodied in a carrier wave. An example of such systems is personal computers. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 400 is connected (by wired connection or wirelessly) to a local network through the network interface or adapter 424, which is one type of communications device. When used in a WAN-networking environment, the computer system 400 typically includes a modem, a network adapter, or any other type of communications device for establishing communications over the wide area network. In a networked environment, program modules depicted relative to the computer system 400 or portions thereof, may be stored in a remote memory storage device. It is appreciated that the network connections shown are examples of communications devices for and other means of establishing a communications link between the computers may be used.

In an example implementation, deduplication table management and/or data priority assignment software and other modules and services may be embodied by instructions stored on such storage systems and executed by the processor 402. Some or all of the operations described herein may be performed by the processor 402. Further, local computing systems, remote data sources and/or services, and other associated logic represent firmware, hardware, and/or software configured to control data access. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 402 and a user may interact with a Graphical User Interface (GUI) using one or more user-interface devices (e.g., the keyboard 416, the display unit 418, and the user devices 404) with some of the data in use directly coming from online sources and data stores.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
  receiving a first change mode operating system command for a file system object having an associated access control list data structure, the access control list data structure including a plurality of access control entries, each access control entry defining access rights for the file system object, wherein the first change mode operating system command reduces at least a first set of access rights to the file system object;
  in response to the first change mode operating system command, modifying a first set of the access control entries corresponding to the first set of access rights to the file system object, wherein said modifying includes retaining an original unmodified copy of the first set of access control entries;
  receiving a request associated with a first user to access the file system object;
  in response to the request, determining whether or not to provide access to the file system object based on the modified first set of access control entries corresponding to the to the first set of access rights;
  receiving a second change mode operating system command for the file system object, wherein the second change mode operating system command is less restrictive than the first change mode operating system command with respect to the first set of access rights to the file system object; and
  in response to the second change mode operating system command, performing a second modification of the first set of the access control entries corresponding to the less restrictive first set of access rights to the file system object, wherein performing said second modification of the first set of the access control entries comprises:
    retrieving the original unmodified copy of the first set of access control entries; and
    determining values for the second modification of the first set of the access control entries based in part on the original unmodified copy of the first set of access control entries.

2. The method of claim 1, wherein the second modification of the first set of the access rights define mode permissions that apply to a class.

3. The method of claim 2, wherein one or more of the unmodified copy of the first set of access control entries exceeds the maximum permissions set by the second modification of the first set of access rights that apply to the class.

4. The method of claim 3, wherein the class is an owning group class that corresponds to any users in a same group as an owner of the file system object and one or more hidden access control entries apply to a user or a group that is not the owner of the file system object.

5. The method of claim 3, wherein the class is an owner class that corresponds to an owner of the file system object and one or more hidden access control entries apply to the owner of the file system object.

6. The method of claim 1, wherein the retaining of the original unmodified copy of the first set of access control entries is performed based on a determination that the first change mode operating system command reduces the first set of access rights to the file system object.

7. The method of claim 1, further comprising:
in response to the second change mode operating system command, determining whether the second change mode operating system is more restrictive or less restrictive than the first change mode operating system command, with respect to the first set of access rights to the file system object; and
in response to determining that the second change mode operating system command is less restrictive than the first change mode operating system command with respect to the first set of access rights to the file system object, determining not to retain the modified first set of access control entries corresponding to the to the first set of access rights.

8. One or more non-transitory tangible computer-readable storage media storing computer-executable instructions for performing a computer process on a computing system, the computer process comprising:
obtaining a first access control list data structure corresponding to a data object, the first access control list having one or more access control entries defining file permission bits for the data object;
receiving a first change mode operating system command for the data object, wherein the first change mode operating system command reduces at least a first set of access permissions for the data object;
in response to the first change mode operating system command, generating a second access control list for the data object by modifying the one or more access control entries of the first access control list based on the first change mode command, wherein said modifying includes retaining an original unmodified copy of the access control entries within the first access control list;
receiving a request associated with a first user to access the data object;
in response to the request, determining whether or not to provide access to the data object based on the modified access control entries of the first access control list, corresponding to the reduced first set of access permissions for the data object;
receiving a second change mode operating system command for the data object, wherein the second change mode operating system command is less restrictive than the first change mode operating system command with respect to the first set of access permissions for the data object; and
in response to the second change mode operating system command, generating a third access control list for the data object by modifying the second access control list based on the second change mode operating system command corresponding to the less restrictive first set of access permissions for the data object, wherein generating the third access control list for the data object comprises:
retrieving the original unmodified copy of the access control entries within the first access control list; and
determining values for the third access control list based in part on the original unmodified copy of the access control entries within the first access control list.

9. The one or more non-transitory tangible computer-readable storage media of claim 8, wherein the second change mode operating system command defines mode permissions that apply to a class.

10. The one or more non-transitory tangible computer-readable storage media of claim 9, wherein the third access control list includes modified access control entries for the class.

11. The one or more non-transitory tangible computer-readable storage media of claim 10, wherein the class is an owning group class that corresponds to any users in a same group as an owner of the data object.

12. The one or more non-transitory tangible computer-readable storage media of claim 10, wherein the class is an owner class that corresponds to the owner.

13. A system comprising:
a storage layer storing a file system object having an access control list data structure with one or more access control entries defining file permission bits for the file system object; and
an interface layer comprising:
a processing unit comprising one or more processors; and
one or more storage devices in communication with the processing unit, storing thereon sets of instructions which, when executed by the processing unit, cause the system:
receive a first change mode operating system command for the file system object, wherein the first change mode operating system command reduces at least a first set of access rights to the file system object;
in response to the first change mode operating system command, modify a first set of the access control entries corresponding to the first set of access rights to the file system object, wherein said modifying includes retaining an original unmodified copy of the first set of access control entries;
receive a request associated with a first user to access the file system object;
in response to the request, determine whether or not to provide access to the file system object based on the modified first set of access control entries corresponding to the to the first set of access rights;
receive a second change mode operating system command for the file system object, wherein the second change mode operating system command is less restrictive than the first change mode operating system command with respect to the first set of access rights to the file system object; and
in response to the second change mode operating system command, perform a second modification of the first set of the access control entries corresponding to the less restrictive first set of access rights to the file system object, wherein performing said second modification of the first set of the access control entries comprises:
   retrieving the original unmodified copy of the first set of access control entries; and
   determining values for the second modification of the first set of the access control entries based in part on the original unmodified copy of the first set of access control entries.

14. The system of claim 13, wherein the first set of access rights define mode permissions that apply to a class.

15. The system of claim 14, wherein the one or more access control entries that apply to the class are modified in response to the first change mode command.

* * * * *

UNITED STATES PATENT AND TRADEMARK OFFICE
CERTIFICATE OF CORRECTION

PATENT NO. : 9,754,121 B2  
APPLICATION NO. : 13/654734  
DATED : September 5, 2017  
INVENTOR(S) : Week et al.

Page 1 of 1

It is certified that error appears in the above-identified patent and that said Letters Patent is hereby corrected as shown below:

In the Claims

In Column 10, Line 46, in Claim 1, delete "to the to the" and insert -- to the --, therefor.

In Column 11, Line 31, in Claim 7, delete "to the to the" and insert -- to the --, therefor.

In Column 12, Line 57, in Claim 13, delete "to the to the" and insert -- to the --, therefor.

Signed and Sealed this  
Third Day of July, 2018

Andrei Iancu  
*Director of the United States Patent and Trademark Office*